(12) United States Patent
Sato et al.

(10) Patent No.: US 8,329,129 B2
(45) Date of Patent: *Dec. 11, 2012

(54) METHOD FOR PREPARING PYROCHLORE OXIDE, POLYMER ELECTROLYTE FUEL CELL, FUEL CELL SYSTEM, AND METHOD FOR PRODUCING ELECTRO CATALYST FOR FUEL CELL

(75) Inventors: Yasushi Sato, Kanagawa (JP); Tamaki Mizuno, Kanagawa (JP); Yuri Seki, Kanagawa (JP)

(73) Assignee: JX Nippon Oil & Energy Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/148,188

(22) PCT Filed: Feb. 10, 2010

(86) PCT No.: PCT/JP2010/051934
§ 371 (c)(1),
(2), (4) Date: Aug. 5, 2011

(87) PCT Pub. No.: WO2010/092971
PCT Pub. Date: Aug. 19, 2010

(65) Prior Publication Data
US 2011/0294652 A1 Dec. 1, 2011

(30) Foreign Application Priority Data
Feb. 10, 2009 (JP) ................. 2009-028876

(51) Int. Cl.
*C01G 55/00* (2006.01)

(52) U.S. Cl. ............... 423/274; 423/594.9; 423/594.13; 423/594.14; 423/595; 423/599; 427/126.3; 427/126.5; 502/101; 502/102; 502/103; 502/104; 429/400

(58) Field of Classification Search ............ 423/594.9, 423/594.13, 594.14, 595, 599, 274; 502/101–104; 429/400; 427/126.3, 126.5
See application file for complete search history.

(56) References Cited

U.S. PATENT DOCUMENTS

| 3,801,490 | A | 4/1974 | Welch et al. |
| 4,129,525 | A | 12/1978 | Horowitz et al. |
| 4,397,774 | A | 8/1983 | Boonstra et al. |
| 2011/0294652 | A1 | 12/2011 | Sato et al. |

FOREIGN PATENT DOCUMENTS

| JP | 54-72500 A | 6/1979 |
| JP | 1-257136 A | 10/1989 |
| JP | 2-302327 A | 12/1990 |
| JP | 5-36418 A | 2/1993 |
| JP | 8-119637 A | 5/1996 |
| JP | 2003-217598 A | 7/2003 |
| JP | 2010-184824 A | 8/2010 |

OTHER PUBLICATIONS

Translation of Japan 02-302327, Dec. 14, 1990.*
Interntional Search Report for International Application No. PCT/JP2010/051934 mailed May 18, 2011 with English translation.
T. Ozaki et al., "Bi-functional Electrocatalytic Properties of Pb-Ru-based Pyrochlore-Type Oxide", ITE Letters on Batteries, New Technologies & Medicine, vol. 6, No. 4, p. 335-338 (2005).
Y. Shimizu et al., "Electrocatalytic Properties of Pyrochlore-type Oxides in Acidic Electrolyte", ITE Letters on Batteries, New Technologies & Medicine, vol. 4, No. 5, p. 582-586 (2003).
D. Saeki et al., "The 49th Battery Symposium in Japan", Proceedings 3A21, p. 68, (2008).

\* cited by examiner

*Primary Examiner* — Steven Bos
(74) *Attorney, Agent, or Firm* — Cantor Colburn LLP (57) ABSTRACT

The present invention provides a method for preparing a pyrochlore type oxide having a larger specific surface area, a polymer electrolyte fuel cell and a fuel cell system improved in power generation efficiency and capable of being produced more inexpensively, and a method for producing an electro catalyst for a fuel cell, which electro catalyst has a larger specific surface area, is relatively inexpensive, and has high electrode activity per unit mass. A method for preparing a pyrochlore type oxide represented by $A_2B_2O_{7-Z}$ wherein A and B represent a metal element, Z represents a number of 0 or more and 1 or less, A includes at least one selected from the group consisting of Pb, Sn, and Zn, and B includes at least one selected from the group consisting of Ru, W, Mo, Ir, Rh, Mn, Cr, and Re, wherein the pyrochlore type oxide is produced by a reaction of a halide or nitrate of A with an alkali salt of a metal acid of B. A method for producing an electro catalyst for a fuel cell, including producing this oxide in this manner. A polymer electrolyte fuel cell and a fuel cell system including this oxide.

8 Claims, 2 Drawing Sheets

METHOD FOR PREPARING PYROCHLORE OXIDE, POLYMER ELECTROLYTE FUEL CELL, FUEL CELL SYSTEM, AND METHOD FOR PRODUCING ELECTRO CATALYST FOR FUEL CELL

CROSS REFERENCE TO RELATED APPLICATIONS

This is a U.S. national stage application of International Application No. PCT/JP2010/051934, filed on 10 Feb. 2010. Priority under 35 U.S.C. 119(a) and 35 U.S.C. 365(b) is claimed from Japanese Application No. JP 2009-028876, filed 10 Feb. 2009, the disclosure of which is also incorporated herein by reference.

TECHNICAL FIELD

The present invention relates to an electro catalyst alternative to platinum for a fuel cell, and a pyrochlore type oxide that can be used as the catalyst. In addition, the present invention relates to a polymer electrolyte fuel cell and a fuel cell system.

BACKGROUND ART

A fuel cell is a device that generates power by electrochemical reaction of hydrogen (fuel) with oxygen. The product of this reaction is water in principle, and therefore, fuel cells are environmentally friendly. Accordingly, fuel cells have been expected to be used for home cogeneration systems, and their development has been promoted.

Generally, Pt or a Pt alloy is used as a catalyst component used as an electro catalyst of a polymer electrolyte fuel cell (Patent Literature 1).

However, when Pt is used as an anode catalyst, the Pt catalyst surface may be poisoned by CO contained in a reformed gas which is obtained by reforming a hydrocarbon-based fuel, such as city gas. The poisoning impairs the activity of the catalyst and increases anode overvoltage. This causes a decrease in power generation efficiency. Therefore, the development of a catalyst component in which this poisoning by CO is reduced has been required.

In addition, when Pt is used as a cathode catalyst, the cathode overvoltage is large, and the cathode overvoltage causes a decrease in power generation efficiency. Therefore, the development of a catalyst component in which this overvoltage is reduced has been required.

Further, Pt is a metal that is very expensive and is also rare in resources, and therefore, it is feared that Pt will be restricted in terms of cost and the depletion of resources when fuel cells will become widespread in the future. From this viewpoint, the development of a non-Pt-based catalyst component has been required.

It is reported that a pyrochlore type oxide catalyst exhibits high activity as a metal oxide-based non-Pt electro catalyst. It is known that a pyrochlore type oxide catalyst exhibits high hydrogen oxidation activity and CO resistance as an anode catalyst for a fuel cell (Non-Patent Literature 1).

It is known that a pyrochlore type oxide catalyst also exhibits high performance as a cathode for a fuel cell (Non-Patent Literatures 2 and 3).

An electro catalyst for a fuel cell is required to have a large specific surface area for both of the cathode and the anode to exhibit high performance. Generally, the specific surface area of a catalyst may often be increased by way of using carbon black or the like having a large specific surface area and good electronic conductivity as the support.

However, in conventional pyrochlore type oxide catalysts, prolonged heating at a temperature close to 100° C., followed by a calcination step at a temperature approximately 300° C. are necessary during the preparation of the catalyst, and therefore, a decrease in specific surface area associated with an increase in particle diameter has been unavoidable in these processes.

Further, calcination in an oxidizing atmosphere or at a high temperature during catalyst preparation is necessary. Therefore, it has been difficult to use a method, such as allowing a substance having low heat resistance or low oxidation resistance to coexist during catalyst preparation. For example, it has been impossible to use a method of allowing a support having a high specific surface area, such as carbon, to coexist during synthesis.

PRIOR ART LITERATURE

Patent Literature

Patent Literature 1: JP H05-36418A

Non-Patent Literature

Non-Patent Literature 1: T. Ozaki et al., "ITE Letters on Batteries, New Technologies & Medicine" Vol. 6, 2005, p335

Non-Patent Literature 2: Y. Shimizu et. al., "ITE Letters on Batteries, New Technologies & Medicine" Vol. 4, 2003, p. 582

Non-Patent Literature 3: D. Saeki et al., "The 49th Battery Symposium in Japan," Proceedings 3A21, 2008, p. 68)

SUMMARY OF INVENTION

Problems to be Solved by the Invention

It is an object of the present invention to provide a method for preparing a pyrochlore type oxide having a larger specific surface area.

It is another object of the present invention to provide a polymer electrolyte fuel cell improved in power generation efficiency and capable of being produced more inexpensively.

It is a further object of the present invention to provide a fuel cell system improved in power generation efficiency and capable of being produced more inexpensively.

It is an object of the present invention to provide a method for producing an electro catalyst for a fuel cell, which electro catalyst has a larger specific surface area, is relatively inexpensive, and has a higher mass-activity as an electro catalyst.

Means for Solving the Problems

The present invention provides the following methods for preparing a pyrochlore type oxide, polymer electrolyte fuel cell, fuel cell system, and method for producing an electro catalyst for a fuel cell.

1) A method for preparing a pyrochlore type oxide represented by
$A_2B_2O_{7-Z}$
wherein A and B each represent a metal element, Z represents a number of 0 or more and 1 or less,
A includes $A^1$ that is at least one selected from the group consisting of Pb, Sn, and Zn, and B includes $B^1$ that is at least one selected from the group consisting of Ru, W, Mo, Ir, Rh, Mn, Cr, and Re, wherein the pyrochlore type oxide is produced by a reaction of a halide or nitrate of the above A with an alkali salt of a metal acid of the above B.

2) The method according to 1), including:
preparing a first aqueous solution that is an aqueous solution of the halide or nitrate of the above A, and a second aqueous solution that is an aqueous solution of the alkali salt of a metal acid of the above B; and
dropwise delivering one of the first aqueous solution and the second aqueous solution into the other of the first aqueous solution and the second aqueous solution to carry out the reaction to form a precipitate of the pyrochlore type oxide.

3) The method according to 1) or 2), wherein a reaction temperature of the reaction is 0° C. or more and 60° C. or less.

4) The method according to 2) or 3), wherein the pyrochlore type oxide is formed on an electrically conductive material by dispersing the electrically conductive material in either one of the first aqueous solution and the second aqueous solution beforehand, and thereafter carrying out the above dropwise-delivering.

5) The method according to any one of 1) to 4), wherein the above A includes a metal $A^2$ different from the above $A^1$, and/or the above B includes a metal $B^2$ different from the above $B^1$, wherein the above $A^2$ and the above $B^2$ are each independently at least one selected from the group consisting of
La, Ce, Pr, Nd, Pm, Sm, Eu, Gd,
Dy, Ho, Er, Tm, Yb, Lu, Y, Sc, Pb, Bi, Mo, Os, Ru,
W, Ze, Re, Cr, Fe, Mn, Ir, Pt, Pd, Rh, Co, and Ni.

6) The method according to any one of 1) to 5), wherein $A(NO_3)_2$ is used as a precursor of the above A, and $K_2BO_4$ or $Na_2BO_4$ is used as a precursor of the above B.

7) The method according to 6), wherein
the above $A(NO_3)_2$ includes at least $Pb(NO_3)_2$ or $Sn(NO_3)_2$, the above $K_2BO_4$ is $K_2RuO_4$, and the above $Na_2BO_4$ is $Na_2RuO_4$.

8) The method according to 6), wherein
the above $A(NO_3)_2$ includes at least $Pb(NO_3)_2$ or $Sn(NO_3)_2$, the above $K_2BO_4$ is $K_2WO_4$, and the above $Na_2BO_4$ is $Na_2WO_4$.

9) The method according to 6), wherein
the above $A(NO_3)_2$ includes at least $Pb(NO_3)_2$ or $Sn(NO_3)_2$, the above $K_2BO_4$ is $K_2MoO_4$, and the above $Na_2BO_4$ is $Na_2MoO_4$.

10) A polymer electrolyte fuel cell, wherein a cathode electro catalyst includes a pyrochlore type oxide prepared by the method according to any one of 1) to 9).

11) A polymer electrolyte fuel cell, wherein an anode electro catalyst includes a pyrochlore type oxide prepared by the method according to any one of 1) to 9).

12) A fuel cell system including the polymer electrolyte fuel cell according to the above 10).

13) A fuel cell system including the polymer electrolyte fuel cell according to the above 11).

14) A method for producing an electro catalyst for a fuel cell, the electro catalyst including a pyrochlore type oxide represented by
$A_2B_2O_{7-Z}$
wherein A and B each represent a metal element, Z represents a number of 0 or more and 1 or less,
A includes $A^1$ that is at least one selected from Pb, Sn, and Zn, and B includes $B^1$ that is at least one selected from Ru, W, Mo, Ir, Rh, Mn, Cr, and Re, the method including producing the pyrochlore type oxide by a reaction of a halide or nitrate of the above A with an alkali salt of a metal acid of the above B.

15) The method according to 14), including:
preparing a first aqueous solution that is an aqueous solution of the halide or nitrate of the above A, and a second aqueous solution that is an aqueous solution of the alkali salt of a metal acid of the above B; and
dropwise delivering one of the first aqueous solution and the second aqueous solution into the other of the first aqueous solution and the second aqueous solution to carry out the reaction to form a precipitate of the pyrochlore type oxide.

16) The method according to 15), wherein the pyrochlore type oxide is formed on an electrically conductive material by dispersing the electrically conductive material in either one of the first aqueous solution and the second aqueous solution beforehand, and thereafter carrying out the above dropwise-delivering.

Advantages of the Invention

According to an aspect of the present invention, there is provided a method for preparing a pyrochlore type oxide having a larger specific surface area.

According to another aspect of the present invention, there is provided a polymer electrolyte fuel cell improved in power generation efficiency and capable of being produced more inexpensively.

According to a further aspect of the present invention, there is provided a fuel cell system improved in power generation efficiency and capable of being produced more inexpensively.

According to another aspect of the present invention, there is provided a method for producing an electro catalyst for a fuel cell, which electro catalyst has a larger specific surface area, is relatively inexpensive, and has a higher mass-activity as an electro catalyst.

EMBODIMENTS FOR CARRYING OUT THE INVENTION

According to the present invention, it is possible to produce a pyrochlore type oxide catalyst in a liquid phase at approximate room temperature. By carrying out the solution reaction at a temperature condition of such a relatively low temperature, it is possible to suppress grain growth during the production compared with conventional synthesis methods in which treatment is performed at a high temperature.

In addition, according to the method of the present invention, high temperature treatment, such as calcination, is unnecessary, and therefore, it is possible to increase the specific surface area of a pyrochlore type oxide catalyst and further suppress the grain growth of the pyrochlore type oxide catalyst by dispersing an electrically conductive material, such as carbon black, having a large specific surface area in a liquid phase and supporting a pyrochlore type oxide on the electrically conductive material (on the surface of the electrically conductive material), which has been difficult in conventional methods for preparing pyrochlore type oxide catalysts.

In other words, according to the present invention, it is possible to produce a pyrochlore type oxide or an electro catalyst for a fuel cell, the pyrochlore type oxide or the electro catalyst including a pyrochlore type oxide, from a halide or nitrate of a metal A and an alkali salt of a metal acid (acid alkali metal salt) of a metal B, without performing a heating operation. In this manner, the decrease in specific surface area is suppressed during the synthesis of a pyrochlore type oxide, and there is obtained a pyrochlore type oxide catalyst that has high activity and is extremely useful as a cathode catalyst or a CO-resistant anode catalyst for a fuel cell.

A halide or nitrate of A may be referred to as a precursor of A, and an alkali salt of a metal acid of B may be referred to as a precursor of B.

Embodiments of the present invention will be described in detail below.

(Method for Preparing Pyrochlore Type Oxide)

First, a method for preparing a pyrochlore type oxide suitable for an electro catalyst according to an embodiment will be described.

(Basic Method for Preparing Pyrochlore Type Oxide)

Here, a pyrochlore type oxide represented by $A_2B_2O_{7-Z}$ is produced, where A is at least one selected from Pb, Sn, and Zn (this A is referred to as $A^1$), and B is at least one selected from Ru, W, Mo, Ir, Rh, Mn, Cr, and Re (this B is referred to as $B^1$).

An aqueous solution of an alkali salt of a metal acid of the above metal B (a second aqueous solution) is delivered by drops into an aqueous solution of a halide or nitrate of the above metal A (a first aqueous solution). Alternatively, the aqueous solution of the halide or nitrate of the above metal A (the first aqueous solution) is delivered by drops into the aqueous solution of the alkali salt of a metal acid of the above metal B (the second aqueous solution). Thus, the halide or nitrate of the metal A can be reacted with the alkali salt of a metal acid of the metal B to form a precipitate.

At this time, the used amount of the dropwise-delivered aqueous solution out of the first aqueous solution and the second aqueous solution may be the stoichiometric amount of the used amount of the other aqueous solution. The stoichiometric amount here means the stoichiometric ratio of the metals A and B contained in the composition of the pyrochlore type oxide obtained as the final product, and does not necessarily correspond to the neutralization point in the acid-base reaction. In addition, it may be sometimes necessary for the completion of the reaction to excessively use either the salt containing A or B, and even in this case, it is preferred that the excessively added chemical species not exceed 1.2 times the stoichiometry.

The reaction temperature in the preparation of the pyrochlore type oxide is preferably approximate room temperature. The approximate room temperature specifically means 0° C. or more and 60° C. or less, preferably 10° C. or more and 50° C. or less. By setting the reaction temperature to 0° C. or more, further to 10° C. or more, it is possible to suppress a decrease in the solubility of the precursors of the above A and B in the aqueous solutions and excellently prevent the precursors from being deposited during the reaction and during the dropwise-delivering. By setting the reaction temperature to 60° C. or less, further to 50° C. or less, it is possible to excellently prevent the obtained precipitation of the pyrochlore compound from aggregating which results in a decrease in the specific surface area.

The temperatures of the aqueous solutions of the metal salts (the first aqueous solution and the second aqueous solution) when they are used is also preferably 0° C. or more, more preferably 10° C. or more, in terms of the prevention of precursor deposition, and preferably 60° C. or less, more preferably 50° C. or less, in terms of the prevention of precipitation aggregation.

In addition, it is preferred to constantly stir the aqueous solution by a magnetic stirrer, a mechanical stirring blade, or the like so as to achieve a practically uniformly dispersed state, during the dropwise-delivering. At this time, for the purpose of the uniformity of the physical mixed state of the mixture, pure water (ion-exchange water) may be appropriately added, as required.

The concentrations of the aqueous solutions of the metal salts (the concentration of the halide or nitrate of the metal A in the first aqueous solution, and the concentration of the acid alkali metal salt in the second aqueous solution) is preferably in the range of 5 to 500 mmol/L, more preferably 10 to 300 mmol/L. When the aqueous solution concentration is 5 mmol/L or more, it is possible to easily prevent such a situation that the yield decreases with respect to the reaction scale and the reaction is not efficient. When the aqueous solution concentration is 500 mmol/L or less, it is possible to easily prevent the aqueous solutions themselves from becoming unstable in terms of deposition and the like, and it is possible to easily prevent such a situation that the reaction locally occurs during the precipitation and the aggregation is accelerated.

Then, the pyrochlore type oxide (precipitate) can be separated and recovered from the reaction system by filtration, centrifugation, or the like. The obtained pyrochlore type oxide is usually a black or brown solid. The obtained pyrochlore type oxide can be further washed with pure water to remove impurities, such as residual ions. The temperature at this time may also be approximate room temperature.

(Case where Part of Site A and/or Site B are Replaced by Other Metals)

A pyrochlore type oxide according to this embodiment has a composition in which part of the site A and/or part of the site B are replaced (also referred to as doped) by other metals in the pyrochlore type oxide ($A=A^1$, $B=B^1$) obtained by the basic method for preparing a pyrochlore type oxide described above. This doping may improve the catalyst activity, and for this purpose, this embodiment is effective.

In other words, in this embodiment, the above A includes a metal (referred to as $A^2$) different from the above $A^1$, and/or the above B includes a metal (referred to as $B^2$) different from the above $B^1$ (hereinafter $A^2$ and $B^2$ are sometimes referred to as doping metals).

It is preferred that the metals $A^2$ and $B^2$ be each independently at least one selected from La, Ce, Pr, Nd, Pm, Sm, Eu, Gd, Dy, Ho, Er, Tm, Yb, Lu, Y, Sc, Pb, Bi, Mo, Os, Ru, W, Ze, Re, Cr, Fe, Mn, Ir, Pt, Pd, Rh, Co, and Ni. One of these metals may be used alone, but two or more of these metals may be mixed and used.

For these doping metals, the metal $A^2$ can be dissolved in an aqueous solution of a halide or nitrate of the above metal $A^1$ that is a raw material beforehand, in the preparation of the pyrochlore type oxide. The metal $B^2$ can be dissolved in an aqueous solution of an alkali salt of a metal acid of the above metal $B^1$ that is a raw material beforehand. Both of these $A^2$ and $B^2$ can be dissolved in respective aqueous solutions in the form of salts. As the salt of the metal $A^2$, it is possible to use those that can be stably dissolved in the aqueous solution in which the metal salt of $A^1$ has been dissolved. As the salt of the metal $B^2$, it is possible to use those that can be stably dissolved in the aqueous solution in which the metal salt of $B^1$ has been dissolved. For example, a halide or nitrate of $A^2$ can be used as the salt of $A^2$, and an alkali salt of a metal acid of $B^2$ can be used as the salt of $B^2$.

The amount of these doping metals added can be adjusted so that, for example, the chemical formula is $A_{2-X}^1 A_X^2 B_{2-Y}^1 B_Y^2 O_{7-Z}$, wherein $0 \leq X \leq 1$, $0 \leq Y \leq 1$, and $0 \leq Z \leq 1$.

In the present invention, the pyrochlore type oxide can be synthesized in a liquid phase at approximate room temperature. It is desired that the pyrochlore type oxide has a BET specific surface area of 80 m²/g or more. A pyrochlore type oxide having such a specific surface area can be obtained according to the present invention.

(Case where Pyrochlore Type Oxide is Supported on Catalyst Support)

The pyrochlore type oxide produced by the present invention is useful as a catalyst for promoting an electrode reaction. By mixing the pyrochlore type oxide with a solid electrically conductive material, such as carbon, and using the mixture as such an electro catalyst, electronic conductivity suitable for an electrode reaction is ensured, and voids for suitably diffusing a reaction gas, such as a fuel gas or an oxidant gas, can be ensured. Therefore, it is possible to achieve a further improvement in the oxygen reduction activity of the obtained electro catalyst.

The above pyrochlore type oxide and the above solid electrically conductive material may be physically mixed by a mixer, such as a mortar or a ball mill, and used. Preferably, the above pyrochlore type oxide is supported on the electrically conductive material and used. By using the solid electrically conductive material as a support in this manner, it is possible to increase the dispersibility of the pyrochlore type oxide, and it is possible to obtain a catalyst having a larger catalyst specific surface area, high stability, and high activity.

As the above solid electrically conductive material, it is possible to use solids, particularly solid particles, which are insoluble in water that is the solvent used during the synthesis. The solid electrically conductive material is preferably a porous material having a suitable particle diameter and specific surface area. From this viewpoint, it is preferable to mainly use a material containing carbon as the main component. However, the material is not particularly limited as long as it can support the pyrochlore type oxide in a desired dispersed state. Further preferably, the solid electrically conductive material has, in addition to the electric conductivity, a certain level of protonic conductivity, or can hold a medium which has protonic conductivity. From this viewpoint, porous carbon supports, such as carbon black, are preferably used.

For the above electrically conductive material, specifically, one or a mixture of two or more selected from the group consisting of acetylene black, Ketjen Black, Vulcan, Black Pearl, graphitized acetylene black, graphitized Vulcan, graphitized Ketjen Black, graphitized Black Pearl, carbon nanotubes, carbon nanofibers, carbon nanohorns, carbon fibrils, and the like is preferably used as those containing carbon as the main component.

The BET specific surface area of the above electrically conductive material should be preferably 80 m²/g or more, in terms of supporting the pyrochlore type oxide in a highly dispersed state. When the above specific surface area is 80 m²/g or more, the dispersibility of the catalyst component in the above electrically conductive material is suitable, and suitable power generation performance is obtained.

In addition, the size of the above electrically conductive material is not particularly limited. However, it is desired that the average diameter is about 5 to 200 nm, preferably about 10 to 100 nm, in terms of the ease of supporting and controlling the catalyst utilization rate in a suitable range, and the like. The average diameter of the electrically conductive material is measured and calculated by way of TEM observation.

In the electrically conductive material-supported pyrochlore type oxide catalyst, the content of the pyrochlore type oxide should be preferably 5 to 90% by mass with respect to the total amount of the pyrochlore type oxide and the electrically conductive material. When the above content is 90% by mass or less, it is easy to improve the degree of dispersion of the catalyst component on the electrically conductive material, and the effect of improving the power generation performance due to an increase in supported amount is suitably obtained. When the above supported amount is 5% by mass or more, the catalytic activity per unit mass is suitable, and it is possible to easily prevent such a situation that a large amount of the electro catalyst is required in order to obtain desired catalytic activity.

These electrically conductive materials can be dispersed beforehand in an aqueous solution of a halide or nitrate of the above metal A that is a raw material (a first aqueous solution), or in an aqueous solution of an alkali salt of a metal acid of the above metal B (a second aqueous solution), in the preparation of the pyrochlore type oxide.

In addition, the pyrochlore type oxide obtained according to the present invention may be mixed with an electro catalyst conventionally used for a polymer electrolyte fuel cell, for example, an electro catalyst in which noble metal particles and/or noble metal alloy particles are supported on an electrically conductive material, and used as an electro catalyst for a fuel cell.

Such an electro catalyst containing a noble metal and a pyrochlore type oxide can be produced by dispersing beforehand an electro catalyst, in which noble metal particles and/or noble metal alloy particles are supported on an electrically conductive material, in an aqueous solution of a halide or nitrate of the above metal A that is a raw material (a first aqueous solution), or in an aqueous solution of an alkali salt of a metal acid of the above metal B (a second aqueous solution), and then performing dropwise-delivering as described above, in the preparation of the pyrochlore type oxide.

As the electro catalyst in which noble metal particles and/or noble metal alloy particles are supported on an electrically conductive material, used for the production of an electro catalyst containing a noble metal and a pyrochlore type oxide, those conventionally and generally used in electro catalysts in fuel cells (for example, Pt/C, PtCo/C, and Pt—Ru/C, and the like, wherein C represents carbon) can be used without particular limitation.

The applications of the pyrochlore type oxide produced according to the present invention have been described above by taking an electro catalyst in a polymer electrolyte fuel cell as an example, but are not limited thereto. The pyrochlore type oxide may be used as electro catalysts in various types of fuel cells, such as alkaline fuel cells, acid electrolyte fuel cells typified by phosphoric acid fuel cells, direct methanol fuel cells, and micro fuel cells. In addition, the applications of the pyrochlore type oxide produced according to the present invention are not limited to electro catalysts for fuel cells, and the pyrochlore type oxide may also be appropriately used for other applications.

(Power Generating Cell)

Next, a configuration of a power generating cell according to an embodiment of the present invention will be described referring to FIG. 1.

(Basic Cell Configuration)

Figure 1:
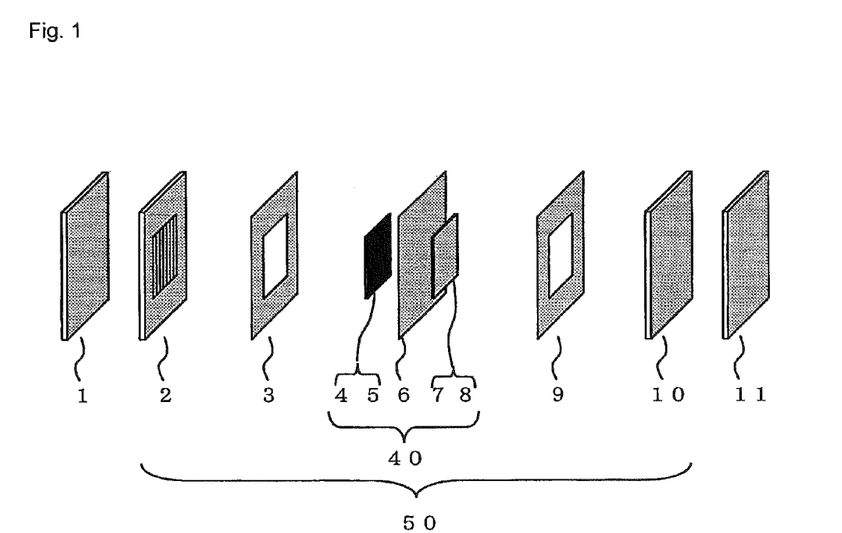
FIG. 1 is an exploded perspective view showing the configuration of a power generating cell according to an embodiment of the present invention.

The basic cell 50 of a polymer electrolyte fuel cell that is one type of fuel cell in which the above pyrochlore type oxide catalyst is used includes a membrane-electrode assembly (MEA) 40, gas sealing members 3 and 9, and separators 2 and 10, as shown in FIG. 1. The above MEA is formed by laminating a GDL (Gas Diffusion Layer) 4 on one surface of a solid polymer electrolyte membrane 6 having hydrogen ion conductivity with an interposed electro catalyst layer 5 (anode catalyst layer) to which hydrogen fuel is supplied, and laminating a GDL 8 on the other surface of the electrolyte membrane 6 with an interposed electro catalyst layer 7 (cathode catalyst layer) to which oxygen is supplied. The electro catalyst layers are porous layers formed of a mixture of a catalyst component for promoting an electrode reaction, an electrically conductive component, and a solid polymer electrolyte having ion conductivity.

The gas sealing member 3 is located on the periphery of the GDL 4 and the electro catalyst layer 5 in order to seal gas and liquid. Similarly, the gas sealing member 9 is located on the periphery of the GDL 8 and the electro catalyst layer 7 in order to seal gas and liquid. The above basic cell 50 is formed by sandwiching the above MEA 40 between the pair of separators 2 and 10. A power generating cell is formed by disposing current collector plates 1 and 11 made of a material having high electric conductivity at both ends of this basic cell, respectively, and tightening them by bolts and nuts, or the like.

The pyrochlore type oxide prepared according to the present invention is used as at least one component of the electro catalyst in the anode and/or cathode catalyst layers 5 and/or 7 in the above power generating cell.

(Separator)

The above pair of separators 2 and 10 separates an anode gas (for example, hydrogen) that is a fuel (reducing agent) and a cathode gas (for example, oxygen) that is an oxidant. A flow channel for introducing the anode gas into the anode is formed on the surface of the separator 2 on the GDL side. On the other hand, a flow channel for introducing the cathode gas into the cathode is formed on the surface of the separator 10 on the GDL side.

(Electro Catalyst Layers and GDLs)

A catalyst layer for promoting the oxidation of the fuel is provided as the anode catalyst layer 5 (fuel electrode) on the side on which the flow channel for the anode gas, such as a hydrogen gas, is formed, out of the electro catalyst layers 5 and 7 included in the MEA. A hydrogen oxidation reaction in which the hydrogen-containing gas, the fuel, is oxidized to hydrogen ions occurs in this catalyst layer. On the other hand, a catalyst layer for promoting the reduction of the oxidant is provided as the cathode catalyst layer 7 (oxygen electrode) on the side on which the flow channel for the cathode gas, such as air (oxygen gas), is formed. An oxygen reduction reaction in which the oxygen contained in the oxidant gas is reduced, that is, bonded to hydrogen ions which have passed through the solid polymer electrolyte membrane, to form water occurs in this catalyst layer. Electric energy is directly obtained from the reaction energy generated by the chemical reaction, to generate power.

The above anode and cathode electro catalyst layers are supported on the GDLs, each of which has electric conductivity and gas diffusivity functions. For example, carbon paper made of carbon fibers is used for the GDLs 4 and 8. The materials for the GDLs 4 and 8 also include carbon cloth. Water repellent treatment may be performed between the GDLs 4 and 8 and the electro catalyst layers 5 and 7 sides to improve gas diffusivity.

(Cell Stack)

A fuel cell main body (fuel cell stack) is formed by stacking a large number of the basic cells 50, and sandwiching them while applying pressing force in the stacking direction. A plurality of manifolds for the supply and discharge of a hydrogen gas (cathode gas), an oxygen gas (anode gas), and a cooling medium are formed through the peripheral portions of the fuel cell stack so that the manifolds communicate with the anode gas flow channels and the cathode gas flow channels formed in the separators. Further, flow channels for the cooling medium (water, ethylene glycol, or the like) are formed between the separators of adjacent cells so that these flow channels communicate with the manifolds for supplying and discharging the cooling medium.

(Gasket)

Sealing members (the gas sealing members 3 and 9, and a sealing member for the cooling medium), such as gaskets, disposed in peripheral portions and around the through holes for the manifolds seal between the MEA 40 and the separators 2 and 10, and between the separators 2 and 10 in order to prevent the leakage of the above gases and cooling medium to the outside. A material that withstands use in the operating temperature range is appropriately used for these sealing members.

[Configuration of Fuel Cell System]

Next, a configuration of a fuel cell system according to an embodiment of the present invention will be described.

(Outline of System)

Figure 2:
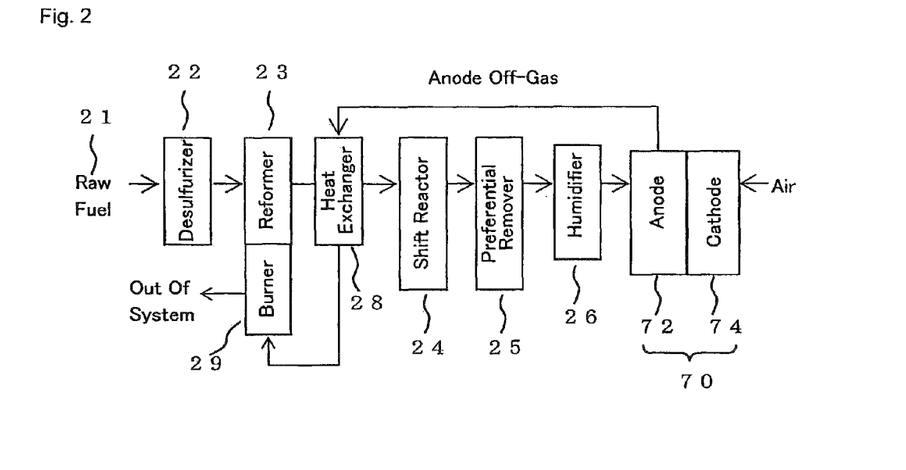
FIG. 2 is a schematic view of a fuel cell system according to an embodiment of the present invention.

FIG. 2 is a schematic view of a fuel cell system according to an embodiment.

The fuel cell system is mainly composed of a hydrogen production apparatus (FPS) that produces hydrogen from a raw fuel, such as kerosene, liquefied petroleum gas (LPG), or city gas, and a fuel cell stack.

(FPS and Raw Fuel)

The FPS is mainly composed of a desulfurizer 22, a reformer 23, and a shift reactor 24. Kerosene, LPG, city gas, or the like can be used as a raw fuel 21. In this embodiment, kerosene is supplied to the desulfurizer 22 as the raw fuel 21, desulfurized, and then reformed in the reformer 23. The reformed gas obtained from the reformer 23 is cooled in a heat exchanger 28 by an anode off-gas from a fuel cell stack 70, and then supplied to the shift reactor 24.

The CO concentration of the reformed gas is reduced in the shift reactor 24 and further reduced in a CO preferential remover 25, and then the reformed gas is humidified in a humidifier 26. The reformed gas which has passed through the humidifier 26 is supplied to each anode 72 of the fuel cell stack 70. When a pyrochlore type oxide or the like is used as the anode catalyst for the fuel cell stack 70, it is possible to generate power even if the CO concentration is higher compared with the case where a usual platinum catalyst is used for the anode. Therefore, even if the CO concentration in the gas discharged from the CO preferential remover is temporarily high when the amount of air flowing into the CO preferential remover fluctuates, the fuel cell system can be operated, thus, it is possible to contribute to an improvement in the reliability of the fuel cell system.

(Gas Introducing Passage and Off-Gas Combustion)

The anode off-gas discharged from the anode 72 is heated in the heat exchanger 28 by way of the heat exchange with the reformed gas, supplied as a combustion fuel to a burner 29 provided in the reformer, combusted there, and then exhausted out of the system. In addition, air is supplied to the cathode 74 of the fuel cell stack 70 as an oxidant, and a cathode off-gas (not shown) discharged from the cathode 74 is heat-recovered as required, and then discharged out of the system.

EXAMPLES

The present invention will be specifically described below by giving Examples, but the present invention is not limited to these Examples.

Example 1-1

Preparation of Pyrochlore Type Oxide $Pb_2Ru_2O_{7-Z}$

A 0.5 mol/L aqueous solution of lead(II) nitrate ($Pb(NO_3)_2$) in which lead(II) nitrate was dissolved in pure water was introduced into a beaker. While the aqueous solution was stirred at room temperature (about 25° C.), a 0.5 mol/L aqueous solution of potassium ruthenate ($K_2RuO_4$) in which potassium ruthenate was dissolved in pure water was delivered by drops into the former aqueous solution so that the molar ratio of Pb to Ru was 1:1. Then, a precipitate generated in the above beaker was filtered off, and washed with pure water. The generated pyrochlore type oxide was taken out, and dried at room temperature. This product had a BET specific surface area of 69 $m^2/g$.

Example 1-2

Preparation of Pyrochlore Type Oxide $Sn_2Ru_2O_{7-Z}$

A 0.5 mol/L aqueous solution of tin(II) nitrate ($Sn(NO_3)_2$) in which tin(II) nitrate was dissolved in pure water was introduced into a beaker. While the aqueous solution was stirred at room temperature (about 25° C.), a 0.5 mol/L aqueous solution of potassium ruthenate ($K_2RuO_4$) in which potassium ruthenate was dissolved in pure water was delivered by drops into the former aqueous solution so that the molar ratio of Sn to Ru was 1:1. Then, a precipitate generated in the above beaker was filtered off, and washed with pure water. The generated pyrochlore type oxide was taken out, and dried at room temperature.

Example 1-3

Preparation of Pyrochlore Type Oxide $Pb_2Ru_2O_{7-Z}$

A 0.5 mol/L aqueous solution of lead(II) nitrate ($Pb(NO_3)_2$) in which lead(II) nitrate was dissolved in pure water was introduced into a beaker. While the aqueous solution was stirred at room temperature (about 25° C.), a 0.5 mol/L aqueous solution of sodium ruthenate ($Na_2RuO_4$) in which sodium ruthenate was dissolved in pure water was delivered by drops into the former aqueous solution so that the molar ratio of Pb to Ru was 1:1. Then, a precipitate generated in the above beaker was filtered off, and washed with pure water. The generated catalyst was taken out, and dried at room temperature.

Example 1-4

Preparation of Pyrochlore Type Oxide $Sn_2Ru_2O_{7-Z}$

A 0.5 mol/L aqueous solution of tin(II) nitrate ($Sn(NO_3)_2$) in which tin(II) nitrate was dissolved in pure water was introduced into a beaker. While the aqueous solution was stirred at room temperature (about 25° C.), a 0.5 mol/L aqueous solution of sodium ruthenate ($Na_2RuO_4$) in which sodium ruthenate was dissolved in pure water was delivered by drops into the former aqueous solution so that the molar ratio of Sn to Ru was 1:1. Then, a precipitate generated in the above beaker was filtered off, and washed with pure water. The generated catalyst was taken out, and dried at room temperature.

Example 1-5

Preparation of Pyrochlore Type Oxide $Pb_2W_2O_{7-Z}$

A 0.5 mol/L aqueous solution of lead(II) nitrate ($Pb(NO_3)_2$) in which lead(II) nitrate was dissolved in pure water was introduced into a beaker. While the aqueous solution was stirred at room temperature (about 25° C.), a 0.5 mol/L aqueous solution of potassium tungstate ($K_2WO_4$) in which potassium tungstate was dissolved in pure water was delivered by drops into the former aqueous solution so that the molar ratio of Pb to W was 1:1. Then, a precipitate generated in the above beaker was filtered off, and washed with pure water. The generated catalyst was taken out, and dried at room temperature.

Example 1-6

Preparation of Pyrochlore Type Oxide $Sn_2W_2O_{7-Z}$

A 0.5 mol/L aqueous solution of tin(II) nitrate ($Sn(NO_3)_2$) in which tin(II) nitrate was dissolved in pure water was introduced into a beaker. While the aqueous solution was stirred at room temperature (about 25° C.), a 0.5 mol/L aqueous solution of sodium tungstate ($Na_2WO_4$) in which sodium tungstate was dissolved in pure water was delivered by drops into the former aqueous solution so that the molar ratio of Sn to W was 1:1. Then, a precipitate generated in the above beaker was filtered off, and washed with pure water. The generated catalyst was taken out, and dried at room temperature.

Example 1-7

Preparation of Pyrochlore Type Oxide $Pb_2Mo_2O_{7-Z}$

A 0.5 mol/L aqueous solution of lead(II) nitrate ($Pb(NO_3)_2$) in which lead(II) nitrate was dissolved in pure water was introduced into a beaker. While the aqueous solution was stirred at room temperature (about 25° C.), a 0.5 mol/L aqueous solution of potassium molybdate ($K_2MoO_4$) in which potassium molybdate was dissolved in pure water was delivered by drops into the former aqueous solution so that the molar ratio of Pb to W was 1:1. Then, a precipitate generated in the above beaker was filtered off, and washed with pure water. The generated catalyst was taken out, and dried at room temperature.

Example 1-8

Preparation of Pyrochlore Type Oxide $Sn_2Mo_2O_{7-Z}$

A 0.5 mol/L aqueous solution of tin(II) nitrate ($Sn(NO_3)_2$) in which tin(II) nitrate was dissolved in pure water was introduced into a beaker. While the aqueous solution was stirred at room temperature (about 25° C.), a 0.5 mol/L aqueous solution of sodium molybdate ($Na_2MoO_4$) in which sodium molybdate was dissolved in pure water was delivered by drops into the former aqueous solution so that the molar ratio of Sn to Mo was 1:1. Then, a precipitate generated in the above beaker was filtered off, and washed with pure water. The generated catalyst was taken out, and dried at room temperature.

Example 2-1

Preparation of Carbon-Supported Pyrochlore Type Oxide $Pb_2Ru_2O_{7-z}/C$

A 0.5 mol/L aqueous solution of lead(II) nitrate (Pb(NO$_3$)$_2$) in which lead(II) nitrate was dissolved in pure water was introduced into a beaker. While the aqueous solution was stirred at room temperature (about 25° C.), carbon powder was dispersed therein. Ketjen Black having a specific surface area of 800 m$^2$/g available from TANAKA KIKINZOKU KOGYO K.K. was used as the carbon powder. While the stirring was continued, into this aqueous solution, a 0.5 mol/L aqueous solution of potassium ruthenate (K$_2$RuO$_4$) in which potassium ruthenate was dissolved in pure water was delivered by drops.

Then, a precipitate generated in the above beaker was filtered off, washed with pure water, and dried at room temperature. A pyrochlore type oxide was formed on the surface of the carbon powder in this manner to obtain a pyrochlore type oxide electro catalyst.

Comparative Example 1

Preparation of Pyrochlore Type Oxide $Pb_2Ru_2O_{7-z}$ According to Conventional Method A precipitate was obtained by a coprecipitation method in which lead nitrate and ruthenium chloride were dissolved in an aqueous solution of caustic soda, and while the solution was heated to 75° C., oxygen gas bubbling was carried out for 24 hours. This precipitate was dried at 120° C. for 12 hours, ground in a mortar, water-washed, then further dried at 120° C. for 12 hours, and ground in a mortar. The obtained powder was calcined in air at 380° C. for 8 hours to obtain a pyrochlore type oxide catalyst. This product had a BET specific surface area of 39 m$^2$/g.

Example 3

Production of Power Generating Cell Using Pyrochlore Type Oxide for Cathode

A power generating cell of this example uses the pyrochlore type oxide according to Example 1-1 as the cathode catalyst. The power generating cell according to this example will be described referring to FIG. 1.

First, a method for making a cathode catalyst layer using a pyrochlore type oxide will be described. A dispersion liquid in which 1 g of acetylene black powder and 1 g of a pyrochlore type oxide produced as in Example 1-1 were dispersed in isopropanol was mixed with a dispersion liquid in which powder of perfluorocarbonsulfonic acid was dispersed in ethyl alcohol to make a cathode catalyst paste.

On the other hand, a water repellent-treated carbon paper having a thickness of 300 μm was cut to A4 size for a GDL 8. One surface of this water repellent-treated carbon paper was coated with the above-described cathode catalyst paste, using a bar coater, to make a cathode catalyst layer using the pyrochlore type oxide on one surface of the carbon paper.

At this time, part of the electro catalyst layer 7 was embedded in the carbon paper. The application amount of the paste-form catalyst coated by the bar coater was adjusted so that the pyrochlore type oxide contained in the electro catalyst layer 7 after the coating was 1 μmol/cm$^2$, and the amount of the perfluorocarbonsulfonic acid contained in the electro catalyst layer 7 after the coating was 1 mg/cm$^2$.

Next, a pair of reaction electrodes (a reaction electrode is a member in which a GDL was integrated with an electro catalyst layer) were brought together by hot pressing so that an electro catalyst layer 5 was in contact with one surface of an electrolyte membrane 6 having an outer size of 8 cm×8 cm and the electro catalyst layer 7 was in contact with the other surface of the electrolyte membrane 6, to fabricate an MEA 40.

At this time, the reaction electrode produced as described above was used on the cathode side.

A catalyst layer adjusted so that the amount of Pt in Pt—Ru/C was 0.4 mg/cm$^2$ and the amount of perfluorocarbonsulfonic acid was 1 mg/cm$^2$ was used as the electro catalyst layer 5 on the anode side. A GDL which was the same as the GDL 8 was used for a GDL 4.

In this example, a perfluorosulfone acid-based electrolyte membrane having a film thickness of 50 μm (manufactured by DuPont; trade name: Nafion CS-212) was used as the electrolyte membrane 6.

In addition, in the hot pressing, a pressure of 10 MPa was applied at 150° C. for 120 seconds.

The above MEA 40 was sandwiched between a pair of separators 2 and 10 to form a basic cell 50. Current collector plates 1 and 11 made of gold-plated copper were disposed at both ends of the above basic cell 50, respectively, and they were tightened at 2N·m with bolts and nuts, or the like to form a power generating cell according to this example.

Example 4

Production of Power Generating Cell Using Pyrochlore Type Oxide for Anode

A power generating cell of this example uses the pyrochlore type oxide catalyst according to Example 1-1 as the anode catalyst. The power generating cell according to this example will be described referring to FIG. 1.

First, a method for making an anode catalyst layer using a pyrochlore type oxide will be described. For the electro catalyst, a solution in which 1 g of acetylene black powder and 1 g of a pyrochlore type oxide produced as in Example 1-1 were dispersed in isopropanol was mixed with a dispersion solution in which powder of perfluorocarbonsulfonic acid was dispersed in ethyl alcohol to make an anode catalyst paste.

On the other hand, a water repellent-treated carbon paper having a thickness of 300 μm was cut to A4 size for a GDL 4. One surface of this water repellent-treated carbon paper was coated with the above-described anode catalyst paste, using a bar coater, to form an anode catalyst layer using the pyrochlore type oxide on one surface of the carbon paper.

At this time, part of the electro catalyst layer 5 (anode catalyst layer) was embedded in the carbon paper. The application amount of the paste-form catalyst coated by the bar coater was adjusted so that the pyrochlore type oxide contained in the electro catalyst layer 7 after the coating was 1 μmol/cm$^2$, and the amount of the perfluorocarbonsulfonic acid contained in the electro catalyst layer 7 after the coating was 1 mg/cm$^2$.

Next, a pair of reaction electrodes (a reaction electrode is a member in which a GDL was integrated with an electro catalyst layer) were brought together by hot pressing so that the electro catalyst layer 5 was in contact with one surface of an electrolyte membrane 6 having an outer size of 8 cm×8 cm and an electro catalyst layer 7 was in contact with the other surface of the electrolyte membrane 6, to fabricate an MEA 40.

At this time, the reaction electrode produced as described above was used on the anode side.

A catalyst layer adjusted so that the amount of Pt in Pt/C was 0.4 mg/cm$^2$ and the amount of perfluorocarbonsulfonic acid was 1 mg/cm$^2$ was used as the electro catalyst layer 7 on the cathode side. A GDL which was the same as the GDL 4 was used for a GDL 8.

In this example, as the electrolyte membrane 6, a membrane which was the same as that in Example 3 was used.

In addition, in the hot pressing, a pressure of 10 MPa was applied at 150° C. for 120 seconds.

The above MEA 40 was sandwiched between a pair of separators 2 and 10 to form a basic cell 50. Current collector plates 1 and 11 made of gold-plated copper were disposed at both ends of the above basic cell 50, respectively, and they were tightened at 2N·m with bolts and nuts, or the like to form a power generating cell according to this example.

Example 5

Fuel Cell System Using Pyrochlore Type Oxide for Cathode

A fuel cell system of this example has a plurality of the basic cells according to Example 3. The fuel cell system according to this example will be described referring to FIG. 2.

50 of the basic cells 50 described in Example 3 were stacked, and current collector plates (end plates) 1 and 11 made of gold-plated copper were disposed at both ends. They were tightened with bolts and nuts, or the like to form a fuel cell stack 70.

Kerosene was used as a raw fuel 21. The raw fuel 21 was passed through a desulfurizer 22 for removing a sulfur component by adsorption, a reformer 23 for producing hydrogen from the desulfurized kerosene, a heat exchanger 28, a shift reactor 24 for converting CO in the reformed gas to $CO_2$ with steam, a CO preferential remover 25 for oxidizing CO not removed by the shift reactor, using air, and a humidifier 26 heated to 70° C., in this order. Thus obtained reformed gas was supplied to the anode 72 of the fuel cell stack 70. With regard to the power generation performance of this cell, the voltage at 200 mA/cm$^2$ was 0.5 V.

Example 6

Fuel Cell System Using Pyrochlore Type Oxide for Anode

By using a pyrochlore type oxide for the anode, a fuel cell system according to this example can better suppress fluctuations in power generation voltage when the CO concentration at the CO preferential oxidation catalyst outlet fluctuates than the fuel cell system according to Example 5.

50 of the basic cells 50 described in Example 4 were stacked, and current collector plates (end plates) 1 and 11 made of gold-plated copper were disposed at both ends. They were tightened with bolts and nuts, or the like to form a fuel cell stack 70.

Kerosene was used as a raw fuel 21. The raw fuel 21 was passed through a desulfurizer 22 for removing a sulfur component by adsorption, a reformer 23 for producing hydrogen from the desulfurized kerosene, a heat exchanger 28, a shift reactor 24 for converting CO in the reformed gas to $CO_2$ with steam, a CO preferential remover 25 for oxidizing CO not removed by the shift reactor, using air, and a humidifier 26 heated to 70° C., in this order. Thus obtained reformed gas was supplied to the anode 72 of the fuel cell stack 70.

In the fuel cell system of Example 5, voltage fluctuations of ±30 mV occurred due to CO concentration fluctuations at the CO preferential oxidation catalyst outlet. On the other hand, in the system of this example, the voltage fluctuations of the cell were within ±10 mV, even when the CO concentration fluctuated, and the operation continued more stably.

Accordingly, a method that can prepare a pyrochlore type oxide at room temperature was found.

In addition, by using this method for preparing a pyrochlore type oxide, a pyrochlore type oxide having a large specific surface area can be obtained. Further, in the case where a pyrochlore type oxide is used for a catalyst, the options for the support are able to be widened, such as the use of carbon for the support.

By using a pyrochlore type oxide produced according to the present invention for the electro catalyst on the anode side, it is possible to reduce a decrease in the reliability of a fuel cell system due to CO concentration fluctuations at the CO preferential remover outlet.

DESCRIPTION OF SYMBOLS

1 current collector plate
2 separator
3 gas sealing member
4 GDL
5 electro catalyst layer (anode side)
6 electrolyte membrane
7 electro catalyst layer (cathode side)
8 GDL
9 gas sealing member
10 separator
11 current collector plate
22 desulfurizer
23 reformer
24 shift reactor
25 CO preferential remover
26 humidifier
28 heat exchanger
29 burner
40 MEA
50 basic cell
70 fuel cell stack
72 anode
74 cathode

The invention claimed is:

1. A method for preparing a pyrochlore oxide represented by $A_2B_2O_{7-Z}$ wherein A and B each represent a metal element, Z satisfies the formula $0 \leq Z \leq 1$, A comprises $A^1$ that is at least one selected from the group consisting of Pb, Sn, and Zn, and B comprises $B^1$ that is at least one selected from the group consisting of Ru, W, Mo, Ir, Rh, Mn, Cr, and Re, the method comprising:

preparing a first aqueous solution that is an aqueous solution of the halide or nitrate of said A, and a second aqueous solution that is an aqueous solution of the alkali salt of a metal acid of said B; and dropwise delivering one of the first aqueous solution and the second aqueous solution into the other of the first aqueous solution and the second aqueous solution to carry out the reaction to form a precipitate of the pyrochlore oxide, wherein the pyrochlore oxide is formed on an electrically conductive material by dispersing the electrically conductive material in either one of the first aqueous solution and the second aqueous solution, and thereafter carrying out said dropwise delivering.

2. The method according to claim 1, wherein a reaction temperature of the reaction is 0° C. or more and 60° C. or less.

3. The method according to claim 1, wherein said A comprises a metal $A^2$ different from said $A^1$, and/or said B comprises a metal $B^2$ different from said $B^1$,
wherein said $A^2$ and said $B^2$ are each independently at least one selected from the group consisting of
La, Ce, Pr, Nd, Pm, Sm, Eu, Gd,
Dy, Ho, Er, Tm, Yb, Lu, Y, Sc, Pb, Bi, Mo, Os, Ru, W, Ze, Re, Cr, Fe, Mn, Ir, Pt, Pd, Rh, Co, and Ni.

4. The method according to claim 1, wherein
$A(NO_3)_2$ is a precursor of said A, and
$K_2BO_4$ or $Na_2BO_4$ is a precursor of said B.

5. The method according to claim 4, wherein
said $A(NO_3)_2$ comprises at least $Pb(NO_3)_2$ or $Sn(NO_3)_2$,
said $K_2BO_4$ is $K_2RuO_4$, and said $Na_2BO_4$ is $Na_2RuO_4$.

6. The method according to claim 4, wherein
said $A(NO_3)_2$ comprises at least $Pb(NO_3)_2$ or $Sn(NO_3)_2$,
said $K_2BO_4$ is $K_2WO_4$, and said $Na_2BO_4$ is $Na_2WO_4$.

7. The method according to claim 4, wherein
said $A(NO_3)_2$ comprises at least $Pb(NO_3)_2$ or $Sn(NO_3)_2$,
said $K_2BO_4$ is $K_2MoO_4$, and said $Na_2BO_4$ is $Na_2MoO_4$.

8. A method for producing an electro catalyst for a fuel cell, said electro catalyst comprising a pyrochlore oxide represented by $$A_2B_2O_{7-Z}$$

wherein A and B each represent a metal element, Z satisfies the formula $0 \leq Z \leq 1$,
A comprises $A^1$ that is at least one selected from the group consisting of Pb, Sn, and Zn, and B comprises $B^1$ that is at least one selected from the group consisting of Ru, W, Mo, Ir, Rh, Mn, Cr, and Re, the method comprising:
preparing a first aqueous solution that is an aqueous solution of the halide or nitrate of said A, and a second aqueous solution that is an aqueous solution of the alkali salt of a metal acid of said B; and
dropwise delivering one of the first aqueous solution and the second aqueous solution into the other of the first aqueous solution and the second aqueous solution to carry out the reaction to form a precipitate of the pyrochlore oxide,
wherein the pyrochlore oxide is formed on an electrically conductive material by dispersing the electrically conductive material in either one of the first aqueous solution and the second aqueous solution, and thereafter carrying out said dropwise delivering.

* * * * *